United States Patent
Walter

(10) Patent No.: US 11,351,853 B2
(45) Date of Patent: Jun. 7, 2022

(54) HYBRID POWERTRAIN AND VEHICLE THEREWITH

(71) Applicant: Schaeffler Technologies AG & Co. KG, Herzogenaurach (DE)

(72) Inventor: Bernhard Walter, Oberkirch-Haslach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 11 days.

(21) Appl. No.: 16/771,905

(22) PCT Filed: Nov. 22, 2018

(86) PCT No.: PCT/DE2018/100953
§ 371 (c)(1),
(2) Date: Jun. 11, 2020

(87) PCT Pub. No.: WO2019/120372
PCT Pub. Date: Jun. 27, 2019

(65) Prior Publication Data
US 2020/0398653 A1    Dec. 24, 2020

(30) Foreign Application Priority Data
Dec. 19, 2017   (DE) .......................... 102017130494.0

(51) Int. Cl.
*B60K 6/387* (2007.10)
*B60K 6/24* (2007.10)
(Continued)

(52) U.S. Cl.
CPC .................. *B60K 6/26* (2013.01); *B60K 6/24* (2013.01); *B60K 6/387* (2013.01); *B60K 6/40* (2013.01); *B60K 6/543* (2013.01)

(58) Field of Classification Search
CPC . B60K 6/26; B60K 6/24; B60K 6/387; B60K 6/40; B60K 6/543
See application file for complete search history.

(56) References Cited

U.S. PATENT DOCUMENTS 6,233,508 B1 * 5/2001 Deguchi ................. B60L 50/15
                                                    180/65.23
6,302,227 B1   10/2001 Takemura et al.
(Continued)

FOREIGN PATENT DOCUMENTS

DE      102 94 154 B4    3/2006
DE      102015112714 A1  2/2017
(Continued)

*Primary Examiner* — John D Walters
(74) *Attorney, Agent, or Firm* — Kevin Parks

(57) ABSTRACT

A hybrid powertrain includes an internal combustion engine, an electrical machine, a transmission, an output, a first separating clutch, and a generator. The internal combustion engine includes a drive shaft for transmitting a drive shaft torque and the electrical machine includes a rotor shaft for transmitting a rotor shaft torque. The transmission is for transmitting the drive shaft torque and the rotor shaft torque, the output is for receiving the drive shaft torque or the rotor shaft torque, and the first separating clutch is for connecting and disconnecting the drive shaft and the output. The generator is arranged in a first torque flow between the drive shaft and the transmission, and includes a generator shaft for converting the drive shaft torque or the rotor shaft torque into electrical energy.

20 Claims, 1 Drawing Sheet

(51) Int. Cl.
*B60K 6/26* (2007.10)
*B60K 6/40* (2007.10)
*B60K 6/543* (2007.10)

(56) References Cited

U.S. PATENT DOCUMENTS

| | | | |
|---|---|---|---|
| 8,307,924 B2 * | 11/2012 | Wang | B60K 6/442 |
| | | | 180/65.23 |
| 10,124,796 B2 * | 11/2018 | Morita | B60W 10/06 |
| 10,384,527 B2 * | 8/2019 | Frank | B60K 6/442 |
| 2014/0228167 A1 | 8/2014 | Frank et al. | |

FOREIGN PATENT DOCUMENTS

| | | |
|---|---|---|
| DE | 102016206278 A1 | 10/2017 |
| DE | 102017103396 A1 | 10/2017 |
| EP | 0962352 A2 | 12/1999 |
| EP | 1 743 107 B1 | 11/2009 |
| JP | 2004042894 A | 2/2004 |
| JP | 2008105622 A | 5/2008 |
| JP | 2017177968 A | 10/2017 |
| WO | 2008077346 A1 | 7/2008 |
| WO | 2015/110108 A1 | 7/2015 |
| WO | 2017/178002 A1 | 10/2017 |

* cited by examiner

HYBRID POWERTRAIN AND VEHICLE THEREWITH

CROSS-REFERENCE TO RELATED APPLICATIONS

This application is the United States National Phase of PCT Appln. No. PCT/DE2018/100953 filed Nov. 22, 2018, which claims priority to German Application No. DE102017130494.0 filed Dec. 19, 2017, the entire disclosures of which are incorporated by reference herein.

TECHNICAL FIELD

The disclosure relates to a hybrid-powertrain, e.g., for a motor vehicle, and a motor vehicle with such a hybrid-powertrain.

BACKGROUND

Hybrid-powertrains for motor vehicles are known from the prior art, in which an internal combustion engine, usually a Otto-engine or Diesel-engine, and an electrical machine are provided. The electrical machine generally via the output thereof, usually two drive wheels, is set up to drive the motor vehicle. The electrical machine is connected in parallel or in series. In a parallel-serial-hybrid, an electrical machine is set up to independently drive the motor vehicle, but at the same time a torque can also be output from the internal combustion engine. In some applications, the installation space is limited and it appears advantageous to use an electrical machine which is too small in size to provide the torque required for starting in any situation. For example, due to this dimensioning, the torque of the electrical machine is not sufficient when starting off on a slope.

It is contemplated to use the internal combustion engine additionally or solely for starting. To achieve this, what is termed a torque converter is used. In one embodiment, such a torque converter has a first blade wheel on the motor side and a second blade wheel on the output side such that a torque can only be transmitted from the first blade wheel to the second blade wheel by means of a liquid set in rotation. Even if this means that the efficiency is relatively low, a smooth start is possible in a small installation space and with few components. In addition, in such a configuration, the electrical machine is set up as the main drive and the internal combustion engine only intervenes as a replacement or support when the torque of the electrical machine is insufficient. If there is little available installation space, the electrical machine is also used as a generator to recharge the storage battery. In the meantime, only a drive by means of an internal combustion engine and also only with part of the torque is possible. Alternatively, no generator is provided and the storage battery can only be charged via an external energy source as a plug-in-hybrid, which means via a socket.

SUMMARY

The disclosure relates to a hybrid-powertrain, comprising at least the following components:
- an internal combustion engine having a drive shaft for delivering a torque;
- a generator with a generator shaft for converting a torque into electrical energy;
- an electrical machine with a rotor shaft for delivering a torque;
- a transmission, which is configured to translate a torque of the drive shaft and a torque of the rotor shaft;
- an output as a consumer of a torque input by the internal combustion engine and/or the electrical machine; and
- at least one separating clutch for connecting and disconnecting a torque transmission from the drive shaft to the output.

The hybrid-powertrain includes the generator arranged in the torque flow between the drive shaft and the transmission.

In the hybrid-powertrain proposed here, an internal combustion engine with a drive shaft rotatable about a combustion axis, for example a crankshaft, a generator with a generator shaft rotatable about a generator axis, and an electrical machine with a rotor shaft rotatable about a rotor axis are provided. The internal combustion engine and the electrical machine are jointly connected to an output via a transmission, for example a gear stage transmission. In a motor vehicle, the output forms, for example, a drive wheel or two drive wheels, of a common wheel axle, i.e., a front axle or a rear axle which can be switched on and off, with all wheels in a four-wheel drive.

According to an example embodiment, the electrical machine is flange-mounted directly to the transmission on the input side, so that an axially space-saving arrangement is achieved.

The transmission is designed with a rigid translation ratio or with a variable, for example switchable, translation ratio. The drive shaft and the rotor shaft are connected to a common input side of the transmission for torque output. In an example embodiment, the drive shaft and the rotor shaft are aligned with one another. In one embodiment, the rotor shaft additionally has a rigid transmission gear, for example a planetary transmission, by means of which the speed ranges of the internal combustion engine and the electrical machine are transferred to the same range.

The hybrid-powertrain proposed here has at least one separating clutch, which makes it possible to interrupt a torque transmission between the internal combustion engine and the output. This means that the inertial mass of the internal combustion engine need not be brought along permanently and purely electric driving is made possible.

It is now proposed here that the generator be arranged in the torque flow between the output and the transmission. The generator is arranged, for example, with the generator axis thereof parallel to the combustion axis, for example as a belt-starter-generator. In an example embodiment, the generator is arranged coaxially with the drive shaft. In comparison to the variant mentioned at the outset, which has a torque converter, the generator is used in an installation space-neutral manner instead of the torque converter. If the torque of the electrical machines is not sufficient, the internal combustion engine can be switched on so that the required torque can be delivered solely from the internal combustion engine to the output, or a supporting torque can be output, which is introduced into the output together with the torque of the electrical machine via the common transmission. Furthermore, a switching state can be reached by means of the separating clutch, which is described further below, in which the internal combustion engine is uncoupled.

According to an example embodiment, the generator can also be operated as an electric drive motor. In addition to the torque of the internal combustion engine or alone (depending on the arrangement of the separating clutch), a supporting torque can be delivered by the generator in torque delivery mode, which is introduced into the output via the common transmission.

According to an example embodiment, a single separating clutch is provided. According to the following description, this is designed as a first separating clutch or as a second separating clutch. It should therefore be pointed out that the term second separating clutch does not mean that a first separating clutch must be provided. Unless explicitly stated otherwise, ordinal numbers used in the description only serve to clearly distinguish them and do not reflect the order or order of the components described.

According to an example embodiment of the hybrid-powertrain, a first of the separating clutches is arranged on the combustion side to the generator, and a torque transmission between the drive shaft and the generator shaft can be interrupted by means of the separating clutch. The first separating clutch may be connected to the generator in an axially overlapping manner.

In this embodiment, the separating clutch is arranged on the combustion side, that is between the drive shaft and the generator shaft of the generator. The internal combustion engine can thus be uncoupled from the output, but the generator shaft is permanently connected to the output. A charging operation by means of the interaction of the internal combustion engine and generator is therefore only possible if the drive shaft is connected to the output at the same time. However, it is also possible to absorb the torque generated on the combustion side from the resistance moment of the generator to generate a charging voltage, so that none or only part of the torque of the internal combustion engine is transferred to the output.

According to an example embodiment, the generator can then be operated as an electric drive motor, so that not only the internal combustion engine is set up to deliver a (supporting) torque, but also the generator as an electric drive motor can deliver a (supporting) torque. The separating clutch, if it is the only separating clutch, may be designed as a friction clutch, for example a multi-plate clutch, so that, on the one hand, the generator shaft need not be synchronized with the drive shaft and, on the other hand, a relatively gentle torque increase can be achieved despite a minimum speed of the drive shaft (for example the idling speed). In addition, the friction clutch is suitable for being started via the generator as a starter generator, the drive shaft being able to start slipping via this friction clutch.

According to an example embodiment of the hybrid-powertrain, a second of the separating clutches is arranged on the transmission side of the generator, by means of which a torque transmission between the internal combustion engine and the transmission can be interrupted.

Again, it should be pointed out, that the term second separating clutch does not mean that a first separating clutch must be provided. According to one embodiment, the proposed second separating clutch is the only separating clutch in the torque flow between the internal combustion engine and the transmission. In this embodiment, the separating clutch is arranged on the transmission side, that is between the generator shaft of the generator and the input side of the transmission.

The second separating clutch is now arranged on the transmission side to the generator. This means that the generator can be uncoupled from the transmission by means of this second separating clutch but cannot be uncoupled from the drive shaft by means of this second separating clutch. This second separating clutch enables a storage battery to be charged by the internal combustion engine while at the same time torque can be transmitted to the output by the electric motor. With appropriate electrical wiring, electrical continuation is also possible here if the storage battery is empty or, for reasons of control technology, cannot deliver useful voltage. This can be achieved in that the electrical voltage generated at the generator is, at least in part, directly released to supply the electrical machine by means of the operation of the internal combustion engine.

If the second separating clutch is closed, it is possible to drive the output solely by means of the internal combustion engine and the generator (as an electric drive motor) or to boost same, that is to say to provide a supporting torque with simultaneous delivery of a torque via the rotor shaft of the electrical machine. Furthermore, it is possible to use the internal combustion engine to make part of the torque available to the output and to take part of the torque via the generator in order to charge the storage battery.

According to an example design of the hybrid-powertrain, the drive shaft is indirectly connected to the continuous variable transmission via the uncouplable generator shaft. According to this embodiment, the drive shaft of the internal combustion engine is indirectly connected to the output via the generator shaft. For this purpose, the generator shaft may be arranged to be coaxial with the drive shaft. This arrangement permits a small design and nevertheless fulfills the desired torque profiles as described at the beginning with the at least one separating clutch.

According to an example embodiment, both a first and a second separating clutch are provided, that is to say in the torque flow on the left and right of the generator. This means both charging during torque delivery from the rotor shaft to the output and purely electrical boosting, that is to say by means of the generator uncoupled from the internal combustion engine, which can be operated as an electric drive motor.

According to an example design of the hybrid-powertrain, a first and a second separating clutch according to the description above are arranged in the torque flow, that means in front and behind the generator. The first separating clutch and/or the second separating clutch may be a form-fitting clutch or a form-fitting and force-fitting clutch.

In this embodiment, at least one separating clutch is designed as a form-fitting torque clutch, so that the shafts to be connected must be synchronized with one another at least within a narrow angular velocity range. For example, the separating clutch is designed as a dog clutch. The separating clutch may be form-fitting and force-fitting, for example as what is termed a wedge clutch. A wedge-clutch has a hub cone and a (rounded) polygonal driver cone, which can be inserted axially, e.g., with a corresponding receiving cone designed as a solid spring. With such a wedge clutch, it is possible to switch between relative speeds of 20 to 30 rpm [revolutions per minute], because the engagement is not purely form-fitting, but rather force-fitting.

Because the speed of the generator can be freely adjusted, a relative speed between the drive shaft and/or the input side of the transmission can be regulated to zero or at least brought close enough to zero, so that such a clutch can be switched in (almost) any state. A separating clutch, in which slip at high relative speeds is permissible, is therefore not necessary. A (rather) form-fitting separating clutch is less complex with regard to wiring.

According to one embodiment, the combustion-side (first) separating clutch is a friction clutch and the transmission-side (second) separating clutch is a (force-fitting) form-fitting clutch. Because the speed of the generator can be controlled, synchronization is possible even when the speed is present at the second separating clutch.

In an alternative embodiment, the first separating clutch is as (force-fitting and) form-fitting clutch and the second separating clutch as a friction clutch. The generator shaft is brought to the required speed of the drive shaft. By means of the second separating clutch, the applied speed on the drive shaft (and the gear shaft) can conventionally be introduced into the output relatively smoothly via the friction clutch.

In a further alternative, both separating clutches are as (force-fitting and) form-fitting clutches, and at least one of the two separating clutches may be designed as a wedge-clutch. If a further slipping clutch, for example a friction clutch or a slip clutch, or a torque converter is provided on the transmission output side, that is between the transmission and the outputs, no undesired sudden increase in torque is noticeable at the output.

In a version with a rigid connection between the generator shaft or the transmission-side clutch partner of the second separating clutch, a circuit is possible in which an undesired sudden increase in torque is not passed on to the output. For example, the second separating clutch is separated in order to start the internal combustion engine using the (starter-) generator. Alternatively, a separate starter is provided and the first separating clutch is separated. If the second separating clutch is closed while the drive shaft is separated from the generator shaft by means of the first separating clutch, the first separating clutch is closed as soon as the drive shaft reaches a speed (approximately) equal to the output.

Alternatively, the second separating clutch remains open while the first separating clutch remains closed from the time of starting or at a (synchronized independently from the output) later time. The second separating clutch closes when a speed adjustment between the transmission input side and the generator shaft is achieved. The speed of the transmission input shaft can be controlled via the electrical machine and/or an electrical motor brake (recuperation). The switching processes can be carried out quickly and the driver may not notice anything about the speed adjustment. In order to avoid a tooth-on-tooth gear pairing of a switchable spur-gear drive in the rigid torque train when a torque is to be transmitted, a slow and/or low-torque rotation can be carried out by means of the electrical machine and/or the generator before the introduction of a desired (higher) torque, so that the gear pairing is brought into engagement without torque jump.

Such (force-fitting and) form-fitting clutches have the advantage that they require little installation space and require few additional components for proper operation. Only an axial adjusting device, for example a switchable pressure valve to a pressure source, is necessary to close or open the separating clutch.

According to an example embodiment of the hybrid-powertrain, the transmission is inseparably connected to the output on the output side. In this embodiment, which is expressly compatible with each of the aforementioned embodiments, no further separating clutch, in particular no friction clutch, is provided on the output side of the transmission. In the case of a transmission with a variable translation ratio and/or a purely electric starting, for example by means of an electrical machine and, if necessary, additionally by means of the generator as the electric drive motor, a smooth start is possible in a purely electrically controllable manner and thus does not require an efficiency loss via a permanently interposed clutch, e.g., a friction clutch. This creates a rigid torque transmission between the electrical machine and the output, apart from the transmission elements, and there are no efficiency losses.

According to an embodiment of the hybrid-powertrain, the transmission is a continuous variable transmission. According to this embodiment, a continuous variable transmission is provided between that of the electrical machine and the internal combustion engine, by means of which a continuous variable transmission can be set. Such a continuous variable transmission is known, for example, as a CVT.

As a result, an electrical machine with a low speed and/or a small speed range can be used, which makes it possible to use an electrical machine of small size. Alternatively, a planetary transmission is interposed between the continuously variable transmission and the electrical machine, so that the speed of the electrical machine is high compared to a conventional internal combustion engine and at the same time a torque is low. The planetary transmission converts the torque and reduces the speed to the desired values, for example (speed range on the input side) a speed range from 3,000 rpm [three thousand revolutions per minute] to 7,000 rpm can be used with a torque of 250 Nm. A planetary transmission allows a large speed reduction in a small axial installation space due to the few gear pairings, and a high efficiency compared to spur-gear drive.

According to an example embodiment of the hybrid-powertrain, a third separating clutch is arranged in the torque flow between the rotor shaft and the transmission and the rotor shaft is directly connected, e.g., inseparably, to the output, bypassing the continuously variable transmission. In this embodiment, a third separating clutch is provided between the rotor shaft and the input side of the transmission, by means of which the rotor shaft can be uncoupled from the transmission input side. Furthermore, torque transmission from the electrical machine directly to the output is made possible by means of a direct gear, so that greater efficiency losses via the transmission are avoided. The direct drive between the electrical machine and the output thus formed is set up either for starting to increase the available torque or for (normal) electric driving, where a relatively high speed is required at the drive wheels but not a high torque. In the other case, the torque flow is then conducted through the transmission via the closed third separating clutch.

The third separating clutch may be a (force-fitting and) form-fitting clutch as described above. The rotor shaft must then first be synchronized with the transmission input shaft before the third separating clutch can be closed.

Towards the output, the rotor shaft in the direct drive may be connected with a low-efficiency loss by means of a spur gear. The rotor shaft may be inseparably connected to the output via this direct drive. That means that there is no further separating clutch between the electrical machine and the output. If the third separating clutch is closed, torque continues to run via this direct drive to the output. The associated loss of efficiency can be compensated for by the additional torque from the generator and/or the internal combustion engine.

According to an example embodiment of the hybrid-powertrain, the electrical machine and/or the generator can be operated in both directions of rotation. According to this embodiment, the electrical machine can also be operated in reverse. Alternatively or in addition, the generator can be operated as a drive motor in both directions of rotation. It follows that a reversing gear is not necessary, as reverse motion is then only possible electrically.

In an example embodiment with a continuously variable transmission, for example as described above, a separating clutch, for example a third separating clutch as described above, is provided for the reverse direction of rotation, so that the flexible drive mechanism is operated in one direction only. This simplifies the design of the flexible drive mechanism because the same side of the wrap-round means always forms the load side and thus an efficiency increase is made possible.

According to a further aspect, the disclosure relates to a motor vehicle including a hybrid-powertrain according to an embodiment as described above, the output having at least one drive wheel.

Motor vehicles with a hybrid-powertrain have a small installation space due to the large number of individual drive components. It is therefore advantageous to use a hybrid-powertrain of small size or with a flexible arrangement of the components.

This problem is exacerbated in the case of passenger cars in the small car category according to European classification. The functional units used in a passenger car of the small car category are not significantly reduced in size compared to passenger cars of larger car categories. Nevertheless, the available installation space for small cars is considerably smaller. The hybrid-powertrain proposed here can be designed compactly and is particularly flexible with regard to the arrangement of the components.

The generator may be arranged to be axially overlapping in a coaxial manner to the drive shaft of the internal combustion engine. A torque converter, and preferably also a slipping clutch, are not present in the entire hybrid-powertrain. This enables a compact design and high efficiency. In addition, a simple concept of a separating clutch can be used, with which all desired switching states can be set slip-free.

Passenger cars are assigned to a vehicle category according to, for example, size, price, weight and performance, whereby this definition is subject to constant change based on the needs of the market. In the US market, vehicles in the small car and microcar categories are assigned to the subcompact car category according to European classification, while in the British market they correspond to the super-mini car and city car categories respectively. Examples of the microcar category are a Volkswagen up! or a Renault Twingo. Examples of the small car category are an Alfa Romeo Mito, a Volkswagen Polo, a Ford Fiesta or a Renault Clio. Well-known full-hybrids in the small car category are BMW i3, Audi A3 e-tron or Toyota Yaris Hybrid.

BRIEF DESCRIPTION OF THE DRAWINGS

The disclosure described above is explained in detail below based on the relevant technical background with reference to the associated drawings, which show example designs. The disclosure is in no way restricted by the purely schematic drawings, it being noted that the drawings are not true to size and are not dimensionally accurate and are not suitable for defining proportions. In the following

DETAILED DESCRIPTION

Figure 1:
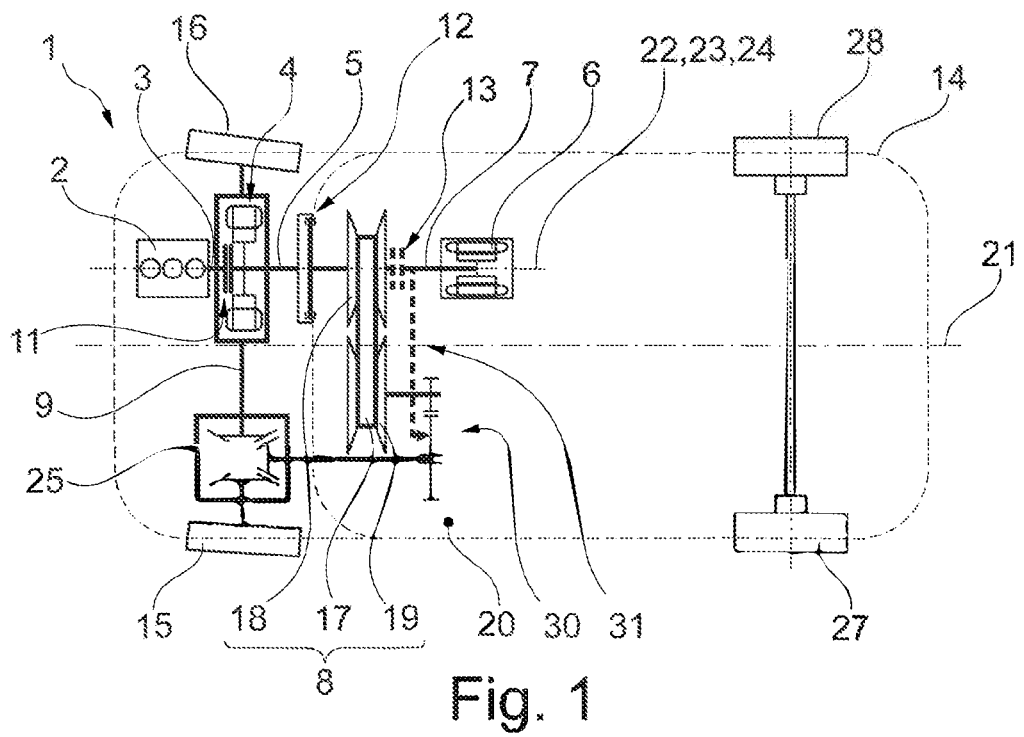
FIG. 1 shows a schematic motor vehicle with a hybrid-powertrain in longitudinal arrangement.

FIG. 1 schematically shows a motor vehicle 14 with a hybrid-powertrain 1, in which an internal combustion engine 2 and an electrical machine 6 are arranged longitudinally. In this context, longitudinally means along the combustion axis 22 and rotor axis 24 thereof parallel to the longitudinal axis 21 of the motor vehicle 14. The generator axis 23 is also aligned and arranged with the combustion axis 22 and the rotor axis 24. The electrical machine 6 is connected with the rotor shaft 7 thereof on the input side to a first cone pulley pair 18 of a transmission 8 designed as a continuous variable transmission, which transmits a continuously variable torque by means of the wrap-round means 17 and the second cone pulley pair 19. On the output side, the transmission 8, here connected to an output drive 9 via a spur-gear drive 30.

In the illustration, output 9 includes a differential 25, which diverts torque to a left front wheel 15 and to a right front wheel 16 as required. According to an optional embodiment, the rear axle, that means also the left rear wheel 27 and the right rear wheel 28, can be connected as an output 9 or can be used permanently for propulsion of the motor vehicle 14.

Between the internal combustion engine 2 or the drive shaft 3 thereof and the first cone pulley pair 18 on the input side, a generator 4 is interposed, which can be used as an electric drive motor. Here, a first separating clutch 11 is provided between the generator shaft 5 and the drive shaft 3, which according to one embodiment is a force-fitting and form-fitting separating clutch. A second separating clutch 12 is also provided between the generator shaft 5 and the first cone pulley pair 18 on the input side, which for example is designed as a friction clutch. In an example embodiment, the first separating clutch 11 is a friction clutch, for example a coaxially overlapping multi-plate clutch within the rotor of the generator, and the second separating clutch 12 is a (force-fitting and) form-fitting clutch. Both separating clutches 11 and 12 may be implemented as (force-fitting and) form-fitting.

Optionally, a third separating clutch 13 is provided here between the rotor shaft 7 and the first cone pulley pair 18 on the input side, a direct gear 31 (shown with a dashed arrow), for example via a spur gear, being formed between the rotor shaft 7 and the output 9. In the example shown here, the hybrid-powertrain 1 is located in front of the driver's cab 20 or partly below the driver's cab 20. The illustration may be shown stretched lengthwise compared to an actual design, so that the internal combustion engine 2 and the electrical machine 7 can be placed in front of the driver's cab 20.

Figure 2:
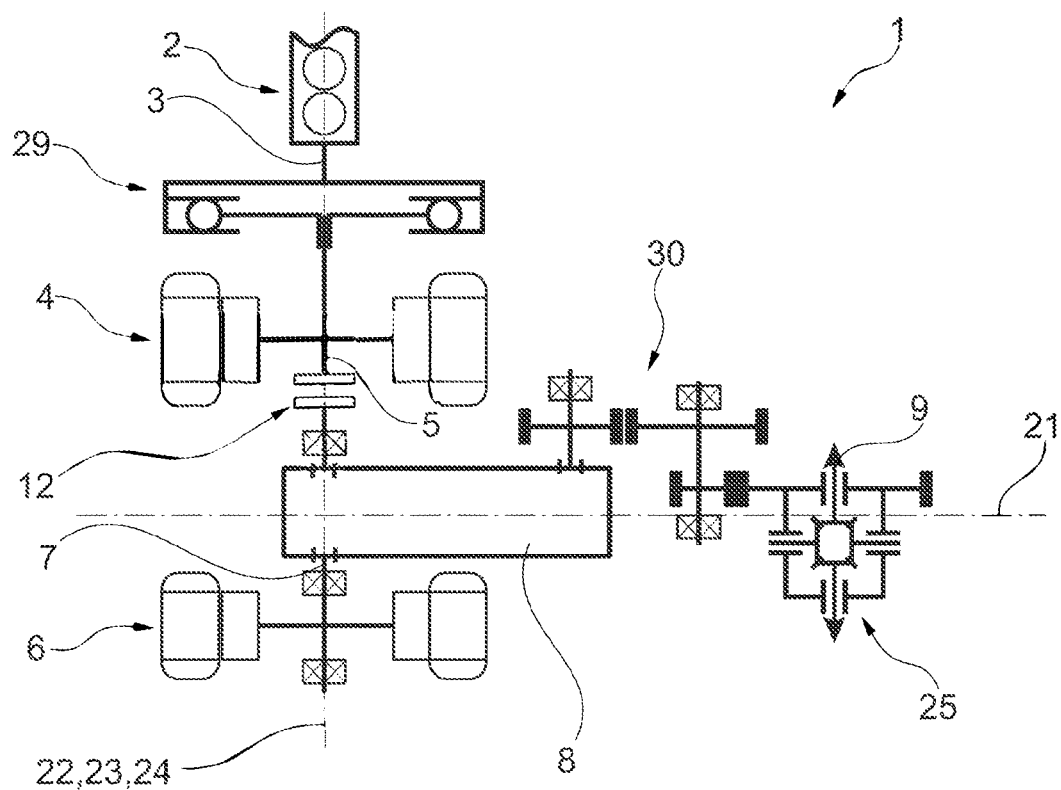
FIG. 2 shows a schematic hybrid-powertrain for a motor vehicle in transverse arrangement.

In FIG. 2 a hybrid-powertrain 1 is shown schematically, which is set up for a transverse arrangement, as where the combustion axis 22, rotor axis 24 and here also the generator axis 23 can be arranged transverse to the longitudinal axis 21 in a motor vehicle 14 (compare FIG. 1). Correspondingly, the output 9 is indicated with the circuit diagram of a differential 25. Apart from that, in a further optional alternative to the embodiment of the hybrid-powertrain 1 shown in FIG. 1, a transmission 8 is shown here, which is, for example, a switchable multi-step transmission. A continuous variable transmission can also be used here.

Furthermore, in contrast to the embodiment according to FIG. 1, the generator 4 has the second separating clutch 12 on the transmission side only (and no first separating clutch 11 as in FIG. 1). This second separating clutch 12 enables the storage battery to be charged by means of the internal combustion engine 2, while the electrical machine 6 delivers a torque to the output 9. Apart from that, in a further optional alternative to the hybrid-powertrain 1 shown in FIG. 1, input shaft 3 also has a dual-mass flywheel 29 which dampens torque vibrations so that a corresponding vibration load is not transmitted to the generator shaft 5, the transmission 8 and the output 9.

It should be pointed out that the embodiments according to FIG. 1 and FIG. 2 can be combined to form a different composition of the components within the scope of the above-mentioned embodiments, and the optional features of both illustrations are interchangeable or can be supplemented individually.

With the hybrid-powertrain proposed here, a large number of switching states with controllable complexity of setting the switching states is possible in a small installation space.

REFERENCE NUMERALS

1 Hybrid-Powertrain
2 Internal Combustion Engine
3 Drive Shaft
4 Generator
5 Generator Shaft
6 Electric Machine
7 Rotor Shaft
8 Transmission
9 Output
11 First Separating Clutch
12 Second Separating Clutch
13 Third Separating Clutch
14 Motor Vehicle
15 Left Front Wheel
16 Right Front Wheel
17 Wrap-Round Means
18 First Cone Pulley Pair
19 Second Cone Pulley Pair
20 Driver's Cab
21 Longitudinal Axis
22 Combustion Axis
23 Generator Axis
24 Rotor Axis
25 Differential
27 Left Rear Wheel
28 Right Rear Wheel
29 Dual-Mass Flywheel
30 Helical Gear Stages
31 Direct Gear

The invention claimed is:

1. A hybrid powertrain comprising:
an internal combustion engine comprising a drive shaft for transmitting a drive shaft torque;
an electrical machine comprising a rotor shaft for transmitting a rotor shaft torque;
a transmission for transmitting the drive shaft torque and the rotor shaft torque;
an output for receiving the drive shaft torque or the rotor shaft torque;
a first separating clutch for connecting and disconnecting the drive shaft and the output; and
a generator:
  arranged in a first torque flow between the drive shaft and the transmission; and
  comprising a generator shaft for converting the drive shaft torque or the rotor shaft torque into electrical energy, wherein:
the output is arranged on an output side of the transmission; and
the transmission is inseparably connected to the output on the output side.

2. The hybrid powertrain of claim 1, wherein:
the internal combustion engine is arranged on a combustion side of the generator;
the first separating clutch is arranged on the combustion side of the generator;
a torque transmission between the drive shaft and the generator shaft can be interrupted by the first separating clutch; and
the first separating clutch is connected to the generator in an axially overlapping manner.

3. The hybrid powertrain of claim 1 further comprising:
a second separating clutch for connecting and disconnecting the internal combustion engine and the transmission, wherein:
the transmission is arranged on a transmission side of the generator; and
the second separating clutch is arranged on the transmission side of the generator.

4. The hybrid powertrain of claim 1, further comprising a second separating clutch for connecting and disconnecting the internal combustion engine and the transmission, wherein:
the internal combustion engine is arranged on a combustion side of the generator;
the first separating clutch is:
  arranged on the combustion side of the generator;
  arranged to interrupt a torque transmission between the drive shaft and the generator shaft; and
  connected to the generator in an axially overlapping manner;
the transmission is arranged on a transmission side of the generator; and
the second separating clutch is arranged on the transmission side of the generator.

5. The hybrid powertrain of claim 4, wherein:
the generator shaft is coupled to the transmission; and
the drive shaft is indirectly connected to the transmission by the generator shaft.

6. The hybrid powertrain of claim 5, wherein the first separating clutch is a form-fitting clutch or a form-fitting and force-fitting clutch.

7. The hybrid powertrain of claim 6, wherein the first separating clutch is a dog clutch or a wedge clutch.

8. The hybrid powertrain of claim 1, wherein the transmission is a continuous variable transmission.

9. The hybrid powertrain of claim 1 further comprising a third separating clutch arranged in a second torque flow between the rotor shaft and the transmission, wherein the rotor shaft is directly connected to the output.

10. The hybrid powertrain of claim 1, wherein the electrical machine or the generator is operable in opposite rotational directions.

11. A motor vehicle comprising the hybrid powertrain of claim 10, wherein the output comprises a drive wheel.

12. A hybrid powertrain comprising:
an internal combustion engine comprising a drive shaft for transmitting a drive shaft torque;
an electrical machine comprising a rotor shaft for transmitting a rotor shaft torque;
a transmission for transmitting the drive shaft torque and the rotor shaft torque;
an output for receiving the drive shaft torque or the rotor shaft torque;
a first separating clutch for connecting and disconnecting the drive shaft and the output;
a generator:
  arranged in a first torque flow between the drive shaft and the transmission; and
  comprising a generator shaft for converting the drive shaft torque or the rotor shaft torque into electrical energy; and a third separating clutch arranged in a second torque flow between the rotor shaft and the transmission, wherein the rotor shaft is directly connected to the output.

13. The hybrid powertrain of claim 12, wherein:
the internal combustion engine is arranged on a combustion side of the generator;
the first separating clutch is arranged on the combustion side of the generator;
a torque transmission between the drive shaft and the generator shaft can be interrupted by the first separating clutch; and
the first separating clutch is connected to the generator in an axially overlapping manner.

14. The hybrid powertrain of claim 12 further comprising:
a second separating clutch for connecting and disconnecting the internal combustion engine and the transmission, wherein:
the transmission is arranged on a transmission side of the generator; and
the second separating clutch is arranged on the transmission side of the generator.

15. The hybrid powertrain of claim 12, further comprising a second separating clutch for connecting and disconnecting the internal combustion engine and the transmission, wherein:
the internal combustion engine is arranged on a combustion side of the generator;
the first separating clutch is:
arranged on the combustion side of the generator;
arranged to interrupt a torque transmission between the drive shaft and the generator shaft; and
connected to the generator in an axially overlapping manner;
the transmission is arranged on a transmission side of the generator; and
the second separating clutch is arranged on the transmission side of the generator.

16. The hybrid powertrain of claim 15, wherein:
the generator shaft is coupled to the transmission; and
the drive shaft is indirectly connected to the transmission by the generator shaft.

17. The hybrid powertrain of claim 16, wherein the first separating clutch is a form-fitting clutch or a form-fitting and force-fitting clutch.

18. The hybrid powertrain of claim 17, wherein the first separating clutch is a dog clutch or a wedge clutch.

19. The hybrid powertrain of claim 12, wherein the transmission is a continuous variable transmission.

20. The hybrid powertrain of claim 12, wherein the electrical machine or the generator is operable in opposite rotational directions.

* * * * *